(12) United States Patent
Brown et al.

(10) Patent No.: US 6,298,865 B1
(45) Date of Patent: *Oct. 9, 2001

(54) APPARATUS AND METHODS FOR WASHING THE CORED AREAS OF LETTUCE HEADS DURING HARVEST

(76) Inventors: Richard S. Brown, 34325 Chualar Canyon Rd., Chualar, CA (US) 93925; Eugene D. Rizzo, 90 Glen Lake Dr., Pacific Grove, CA (US) 93950

( * ) Notice: Subject to any disclaimer, the term of this patent is extended or adjusted under 35 U.S.C. 154(b) by 0 days.

This patent is subject to a terminal disclaimer.

(21) Appl. No.: 09/295,438

(22) Filed: Apr. 20, 1999

(51) Int. Cl.[7] .......................................................... B08B 3/02
(52) U.S. Cl. .................... 134/25.3; 134/22.1; 134/22.18; 134/22.19; 134/23; 134/133; 134/166 R; 134/169 R; 134/62; 134/83; 134/72; 134/68; 134/126; 134/131; 426/324; 426/334; 426/335; 426/392; 426/442
(58) Field of Search ............................... 134/22.1, 22.18, 134/22.19, 23, 25.3, 133, 166 R, 169 R, 62, 83, 72, 68, 126, 131; 426/324, 334, 335, 392, 442

(56) References Cited

U.S. PATENT DOCUMENTS

| 2,156,840 | * | 5/1939 | Davis | 134/68 |
| 2,322,417 | * | 6/1943 | Christian | 134/72 |
| 4,962,777 | * | 10/1990 | Bell | 134/63 |
| 5,316,778 | * | 5/1994 | Hoogham | 426/324 |
| 5,421,250 | * | 6/1995 | Beaumont | 99/636 |
| 5,954,067 | * | 9/1999 | Brown et al. | 134/25.3 |
| 6,196,237 | * | 3/2001 | Brown et al. | 134/25.3 |

* cited by examiner

*Primary Examiner*—Sharidan Carrillo

(57) ABSTRACT

An apparatus and method for washing a plurality of cored lettuce heads as they are harvested in the field is disclosed. The apparatus incorporates a multi-segment hinged conveyer forming a loop, at least one support platform having an opening, at least one lettuce head guide connected to the support platform and an aqueous solution spraying system. Workers harvest lettuce heads, core the lettuce heads and then place them on the lettuce head guides which are moving along the conveyer. The lettuce heads are conveyed to an aqueous solution spraying system which washes the cored areas of the lettuce heads. The lettuce heads are then removed from the conveyer into a produce bin.

11 Claims, 8 Drawing Sheets

APPARATUS AND METHODS FOR WASHING THE CORED AREAS OF LETTUCE HEADS DURING HARVEST

BACKGROUND OF THE INVENTION

This invention relates to apparatus and methods for washing the cored area of a lettuce head.

The field to which the invention relates is that of agricultural equipment and methods used in harvesting operations.

BRIEF SUMMARY OF THE INVENTION

The invention is an apparatus and method for washing a plurality of cored lettuce heads as they are harvested in the field. The apparatus comprises a conveyer forming a loop, support platforms attached to the conveyer with at least one lettuce head guide connected to each support platform, and an aqueous solution spraying system fixedly attached at a point along said conveyer loop. The claimed method involves the steps of placing at least one cored lettuce head onto a conveyer, conveying the lettuce head(s) to an aqueous solution spraying system, delivering an aqueous solution into the core hole(s) of the lettuce head(s) for a time and at a pressure sufficient to wash the core hole(s), and removing the cored lettuce head(s) from the conveyer.

DETAILED DESCRIPTION OF THE INVENTION

Figure 1:
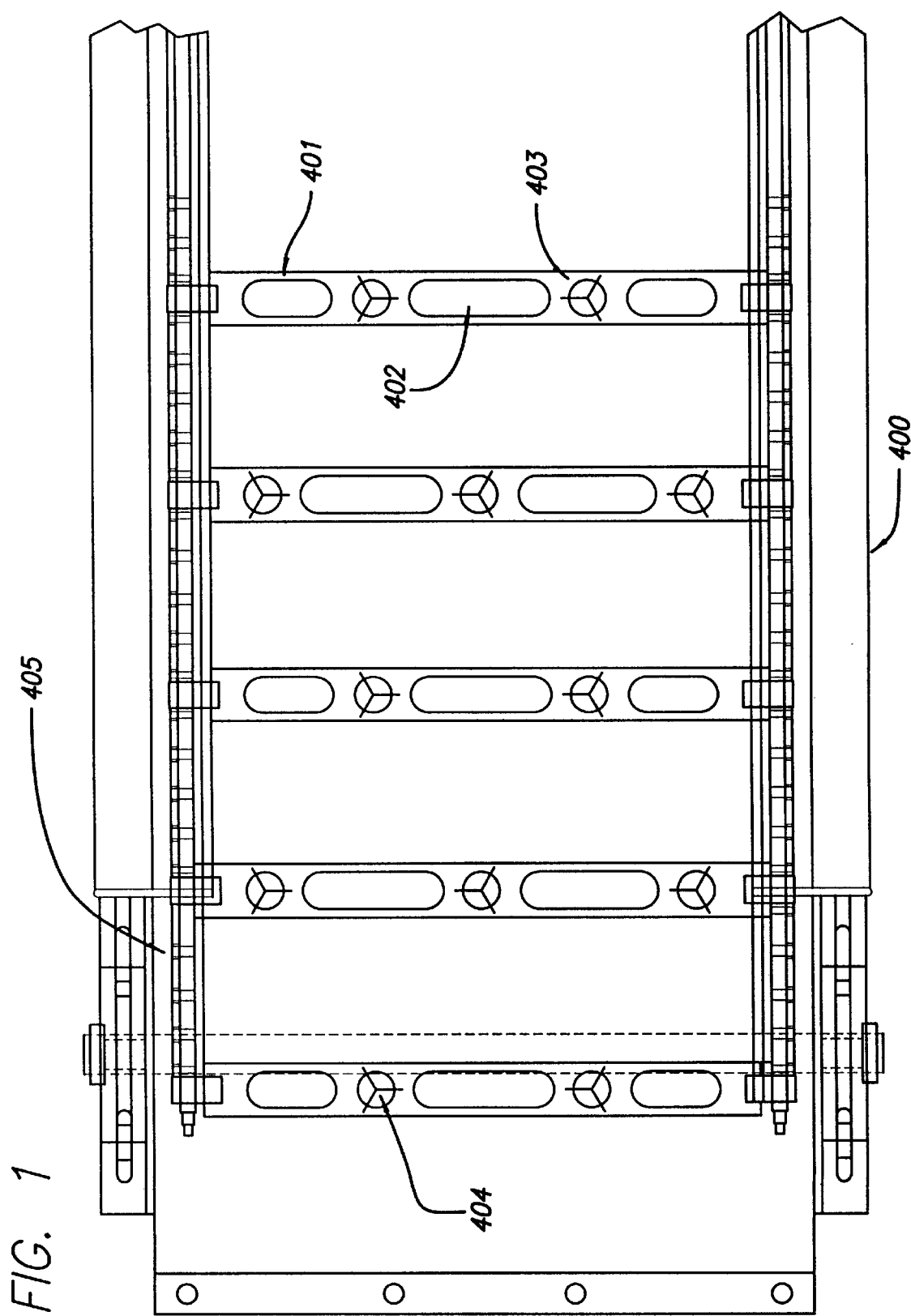
FIG. 1 is a side elevation view of the apparatus for washing the cores of cored lettuce attached to a tractor.
Figure 3:
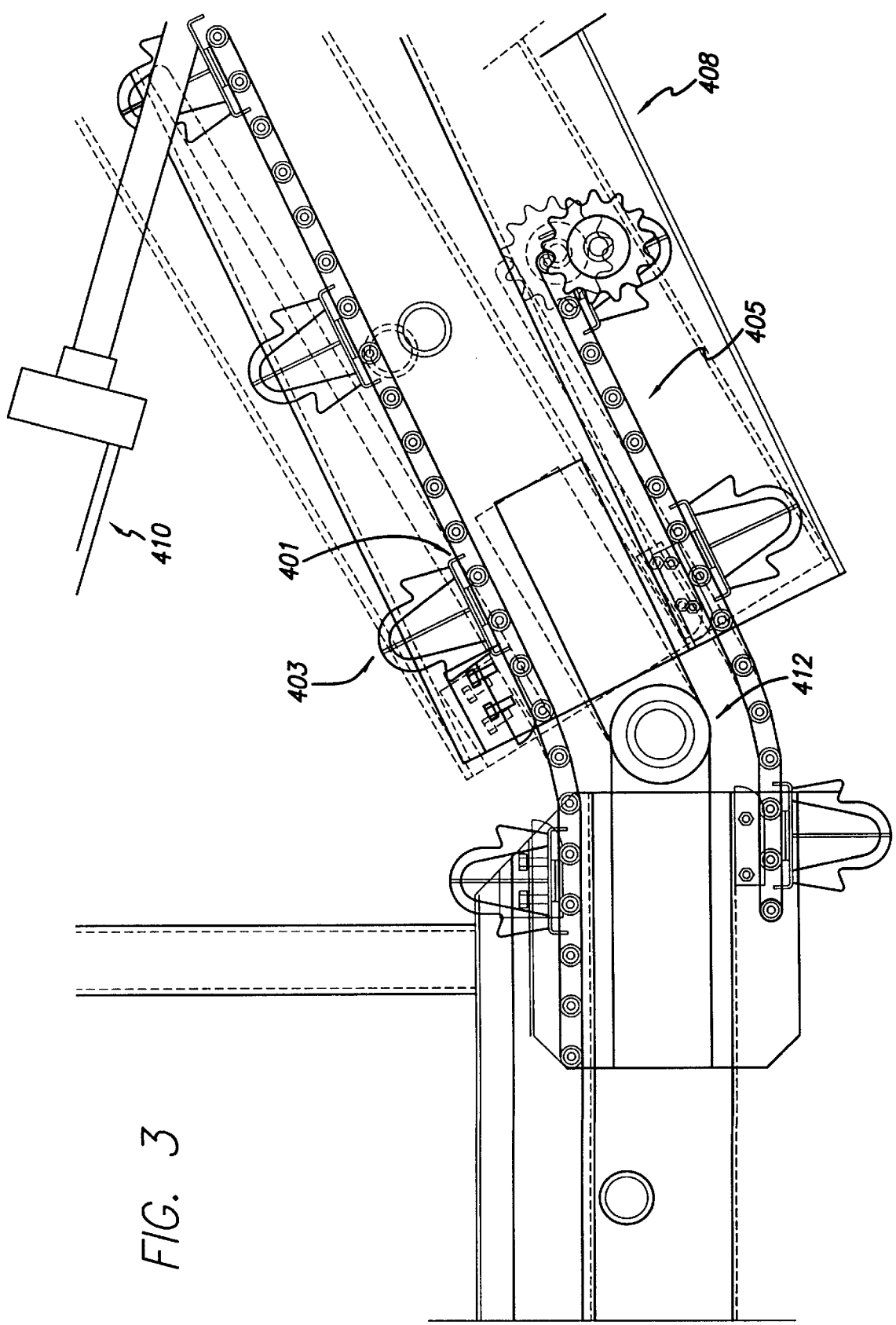
FIG. 3 is an exploded side elevation view in cross section of the hinged area connecting the middle and proximal end segments of the apparatus shown in FIG. 1.
Figure 4:
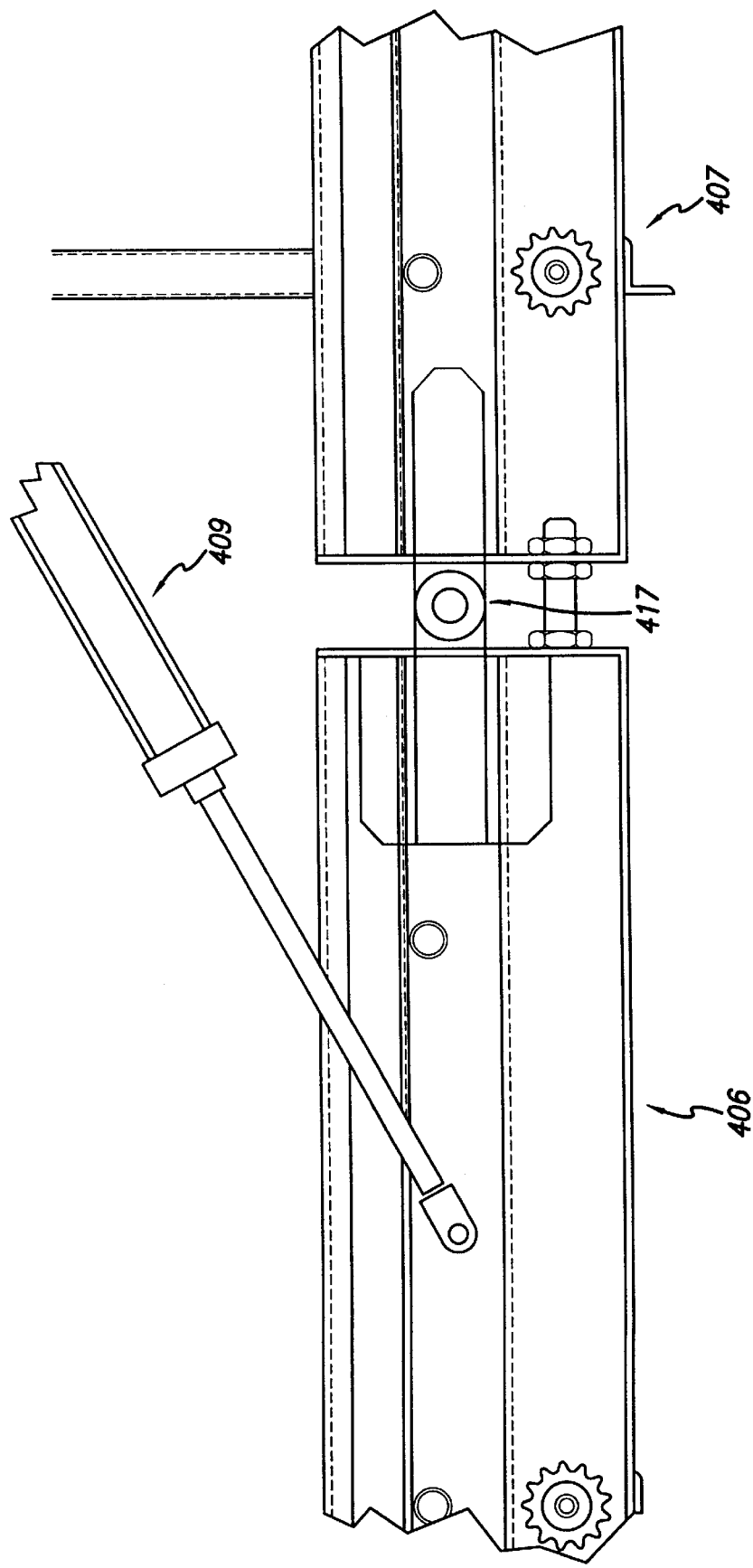
FIG. 4 is an exploded side elevation view in cross section of the hinged area connecting the central and distal end segments of the apparatus shown in FIG. 1.

FIG. 1 shows an embodiment of washing apparatus 400 which includes three hinged sections—a distal end segment 406, a middle segment 407, and a proximal end segment 408. Lifting cylinders 409 and 410, powered and controlled hydraulically, rotate distal end segment 406 and proximal end segment 408 to desired angles of inclination. See FIGS. 3 and 4 for an example. Washing chamber 411 is located on proximal end segment 408 adjacent to connecting hinge 412.

Figure 2:
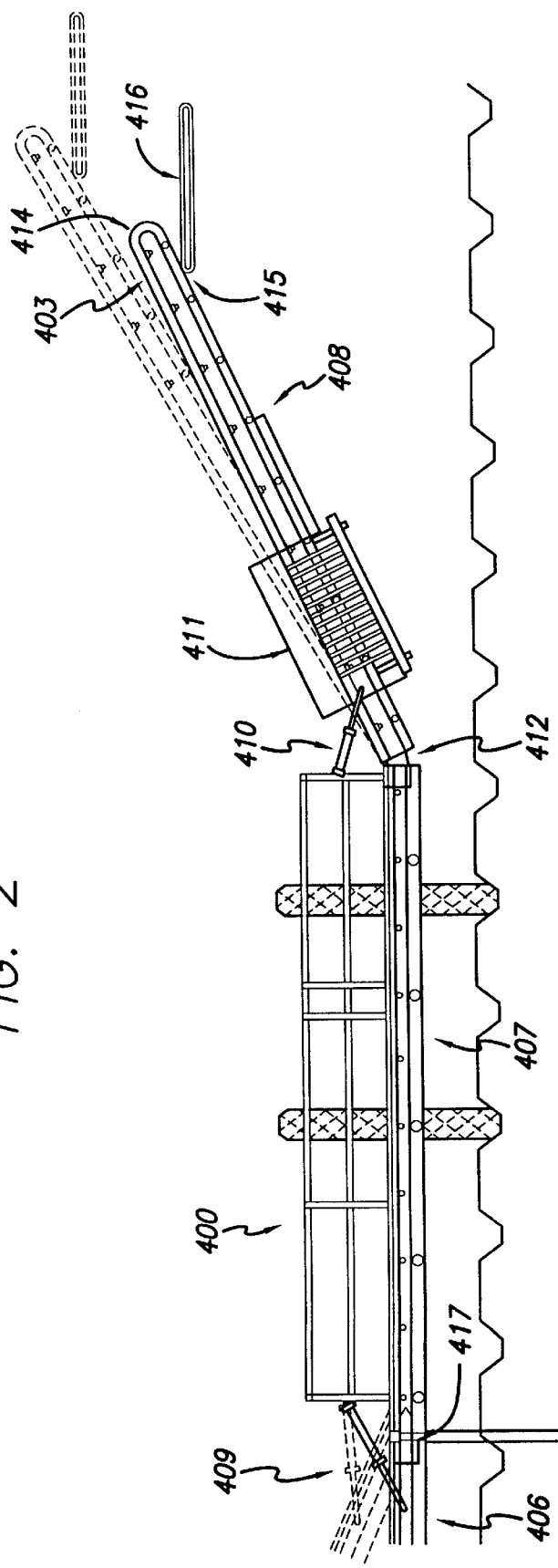
FIG. 2 shows a top plan view of a section of the apparatus of FIG. 1.

FIG. 2 shows lettuce head washing apparatus 400 as viewed from above. Apparatus 400 includes at least one support platform 401 which includes a plurality of openings 402. Platforms 401 support and are connected to guides 403. Guides 403 orient the lettuce heads so that the aqueous solution is delivered to the core holes of the lettuce heads. In FIG. 2, a preferred embodiment of guide 403 is shown as including three L-shaped vanes 404, that project upwardly from platforms 401. Guides 403 may also be circular, posts, spikes, or any other suitable holder used to support and orient the lettuce heads.

Figure 6:
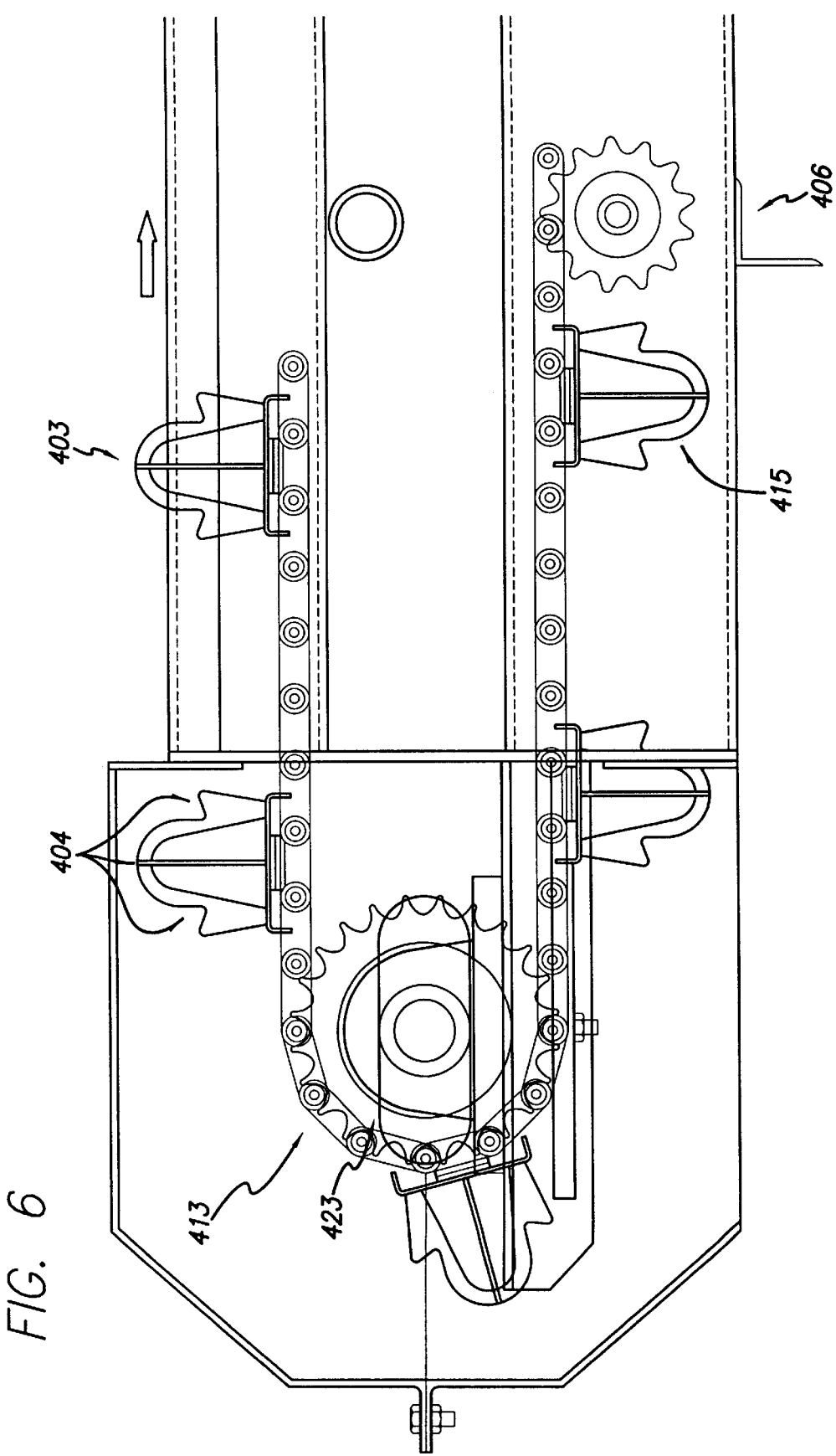
FIG. 6 is an exploded side elevation view in cross section of the unhinged end of the distal end segment in the apparatus of FIGS. 1–5.

Platform 401 is attached at each end to a double pitch chain 405 that forms a loop. Preferably, apparatus 400 includes a plurality of support platforms 401, each with at least two guides 403, attached at intervals along chain 405, such as shown in FIG. 2. In some embodiments platforms 401 are detachable from chain 405. The combination of guides 403, platforms 401, chains 405 and associated frame and driving mechanisms form a looped belt, sometimes called a harvester belt, that moves along an elliptical or other path. Sprockets 423, as shown for example in FIG. 6, are powered and controlled hydraulically to move chain 405, thereby moving attached platforms 401 and connected guides 403. Preferably the belt is attached, at one end, to a hitch of a puller vehicle e.g. a tractor of 40 horse power or greater.

Guides 403 are conveyed in a substantially upright position from unhinged end 413 of distal end segment 406 towards unhinged end 414 of proximal end segment 408. In a preferred embodiment distal end segment 406 is maintained in a horizontal and co-linear position with middle segment 407 during operation. Workers place cored heads of lettuce on guides 403 as they traverse distal end segment 406 and central segment 407 in an upright position. Cored lettuce heads on guides 403 then travel through wash chamber 411 to unhinged end 414 of proximal end segment 408.

Figure 5:
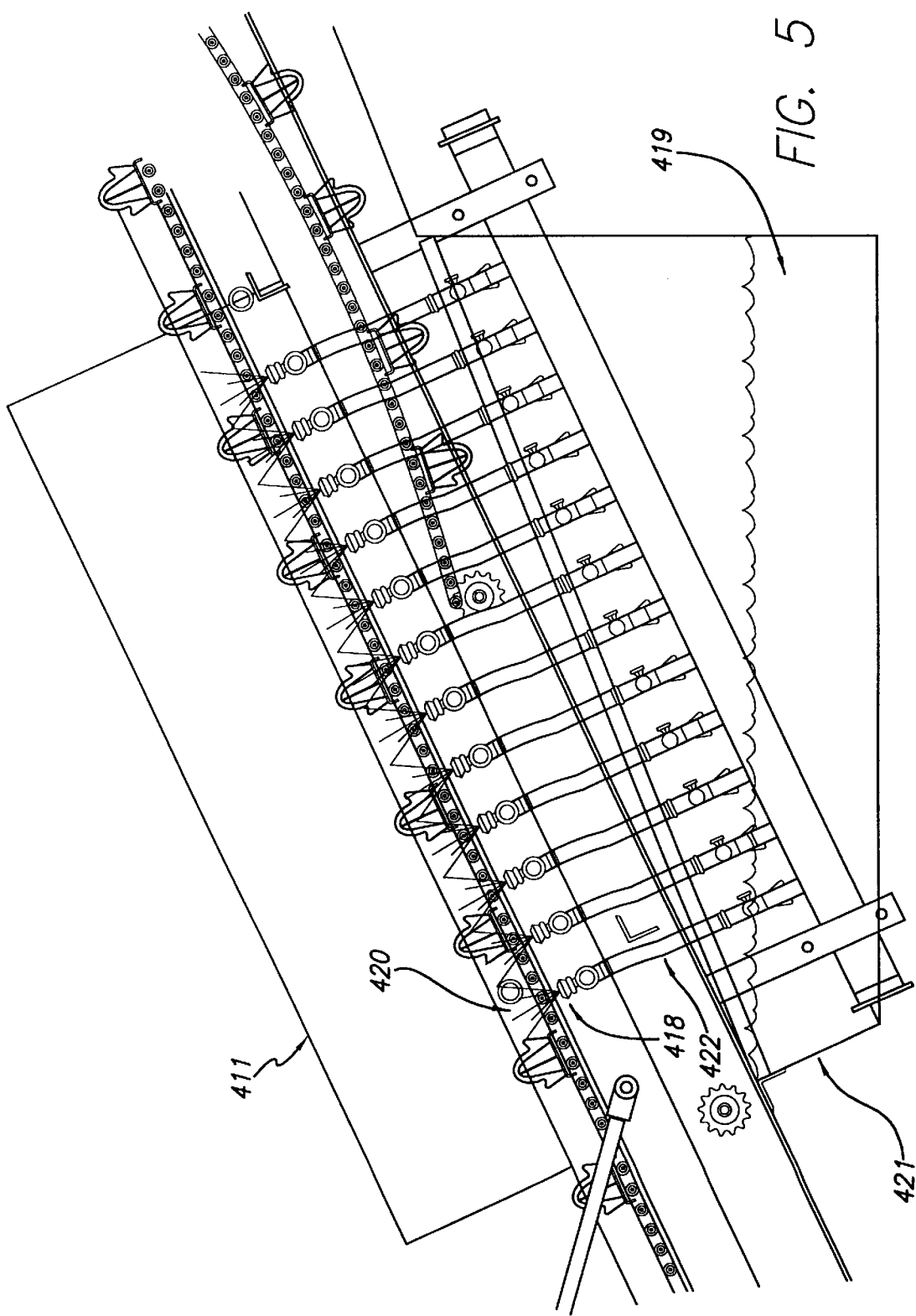
FIG. 5 is a side elevation view in cross section of the wash chamber in the apparatus of FIGS. 1–4.

FIG. 5 shows wash chamber 411. Wash chamber 411 includes one or more spray nozzles 418 that continually spray or otherwise deliver an aqueous lettuce head washing solution 419 into the core holes of the lettuce heads as they travel over nozzles 418. Solution 419 is pumped to nozzles 418 through hoses 422 from supply tank 421 located below wash chamber 411. Solution 419 may be pumped by any suitable pump. Preferred embodiments use a centrifugal pump powered and controlled hydraulically. Solution 419 emerges from nozzles 418 under pressure and travels upward as spray 420 through openings in platforms 401 into the core holes of lettuce heads. Solution 419 which drains from the lettuce is collected, filtered, and recycled by supply tank 421. A preferred embodiment of supply tank 421 used to collect, filter and recycle solution 419 is disclosed in the currently pending U.S. patent application Ser. No. 09/144, 972 filed Sep. 1, 1998 by applicants Richard S. Brown and Eugene D. Rizzo. That application is hereby incorporated by reference.

The level of solution in supply tank 421 is kept at a predetermined level by a float valve. Supply tank 421 may be connected to a tractor mounted nurse tank. Aqueous solution 419 may be pumped from the nurse tank to supply tank 421 by any pump. Preferred embodiments use a cents gal pump, powered and controlled hydraulically.

In some embodiments, a single lettuce head passes over one or more nozzles 418, repeatedly washing the core hole. Nozzles 418 may deliver washing solution 419 at either high pressure and low volume, or low pressure and high volume. Preferred embodiments include both types of nozzles 418.

Figure 7:
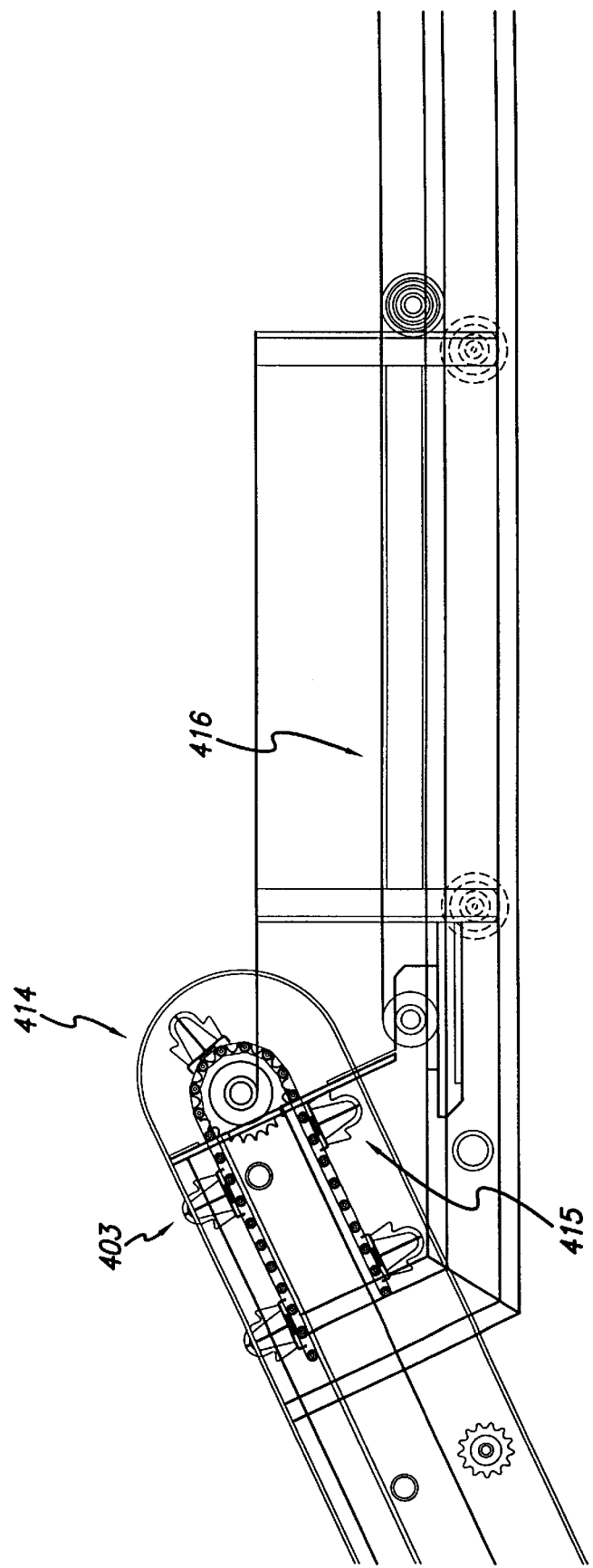
FIG. 7 is an exploded side elevation view in cross section of the unhinged end of the proximal end segment in the apparatus of FIG. 6.
Figure 9:
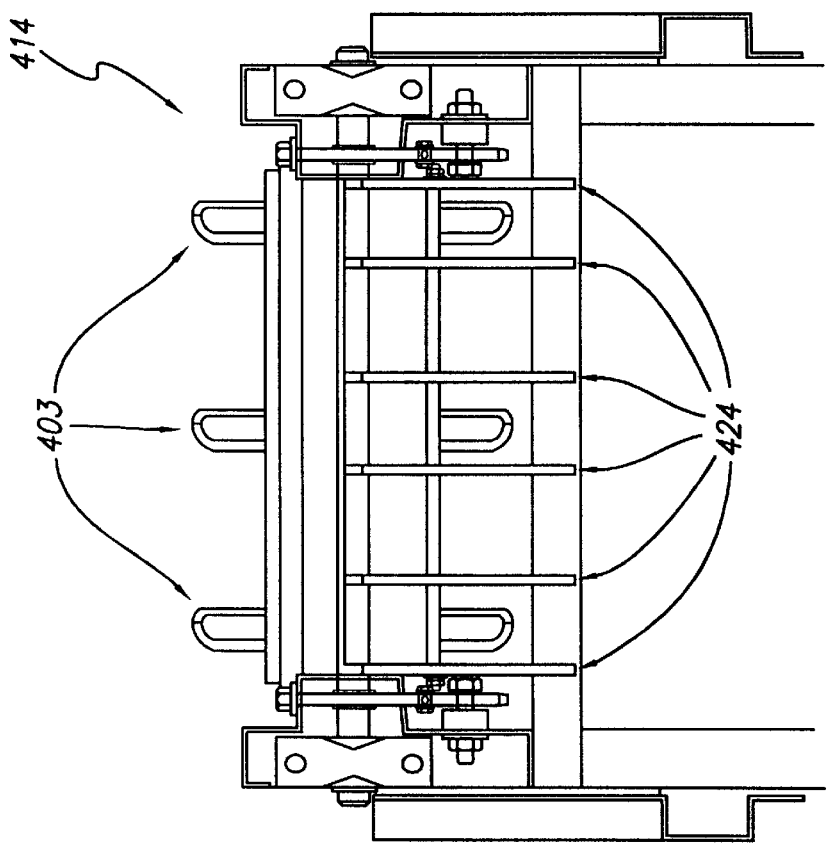
FIG. 9 is an end view of the unhinged end of the proximal end segment showing the removal fingers.
Figure 8:
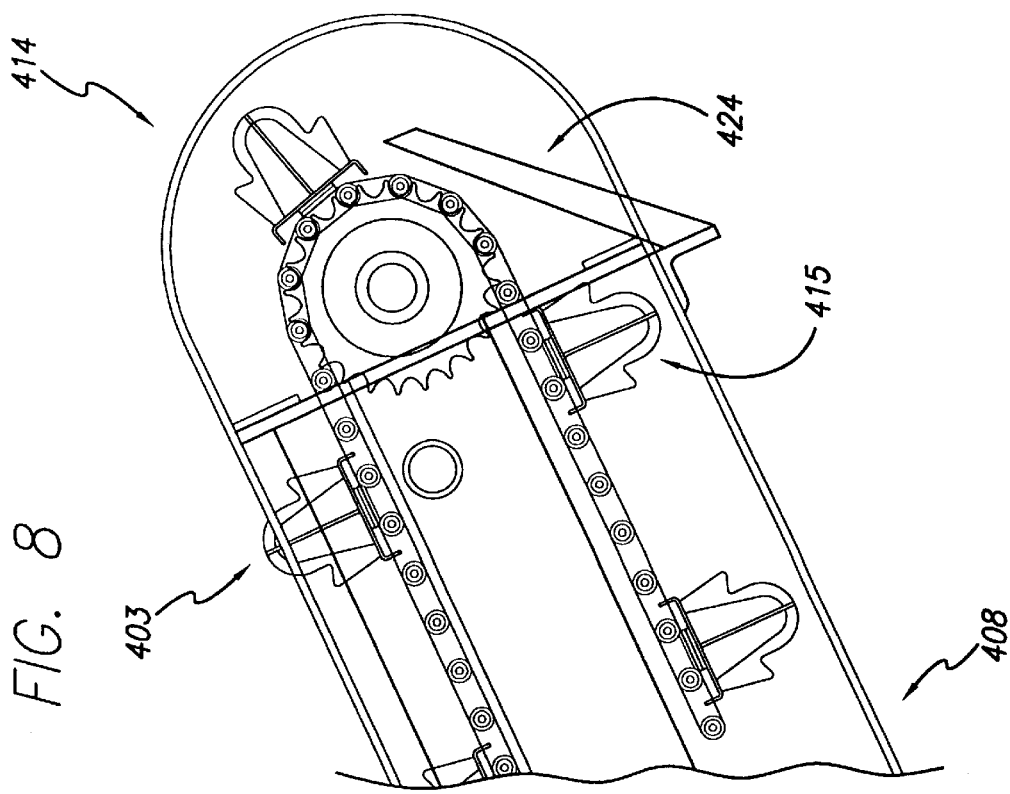
FIG. 8 is an exploded side elevation view in cross section of the unhinged end of the proximal end segment in the apparatus of FIG. 6 showing a removal finger.

After exiting washing chamber 411, the lettuce heads are conveyed to unhinged end 414 of proximal end segment 408. Proximal end segment 408 is preferably elevated, as shown in FIG. 1, at an inclination angle of 25–35 degrees. The washed lettuce heads will thereby be elevated for deposit onto a conveyer or into produce bins. At unhinged end 414 the cored lettuce heads on guides 403 are rotated through an angle to a substantially inverted position 415, as shown, for example, in FIG. 7. In inverted position 415 the cored lettuce heads detach from guide 403. At least one fixed removing finger 424, as shown, for example, in FIGS. 8 and 9, placed adjacent to unhinged end 414 may be used to assist in unseating the lettuce heads. Inverted guides 403 return to unhinged distal end 413 of the harvester belt. There guides 403 rotate through an angle to a substantially upright position. For an example, see FIG. 6. Guide 403 then travels back towards proximal end 408 of the harvester belt for receipt of additional cored lettuce heads to be washed.

What is claimed is:

1. A method for washing at least one head of lettuce with a cored hole comprising the steps of:

placing said at least one cored lettuce head in a position such that the cored hole faces substantially downward;

after said placing step, conveying said at least one cored lettuce head to an aqueous solution spraying system;

delivering an aqueous solution from said aqueous solution spraying system into said cored hole for a time and at a pressure sufficient to wash said cored hole; and removing said at least one cored lettuce head from said position.

2. The method of claim 1 wherein said placing step comprises seating said cored lettuce head on a guide which has a first opening for said aqueous solution to pass through, said guide being attached to a support platform which has at least a second opening.

3. The method of claim 1 wherein said step of delivering an aqueous solution into said cored hole further comprises using:

a tank containing said aqueous solution;

at least one spray nozzle communicating with said tank; and a pump communicating with said tank to deliver said aqueous solution to said at least one spray nozzle.

4. The method of claim 1 wherein said aqueous solution spraying system comprises a fist nozzle and a second nozzle and wherein said first nozzle sprays said aqueous solution at first pressure and a first volume, and where said second nozzle sprays said aqueous solution at a second pressure and a second volume.

5. The method of claim 1 wherein the step of removing said at least one lettuce head further comprises using at least one removing finger device.

6. The method of claim 2 wherein said conveying step comprises conveying said guide along a path forming a loop.

7. The method of claim 3 wherein said at least one spray nozzle sprays said aqueous solution at a first pressure and a first volume.

8. The method of claim 3 comprising the further steps of collecting, filtering, and recycling said aqueous solution which drains from said lettuce heads.

9. The method of claim 3 comprising the further step of maintaining a level of said aqueous solution in said tank at a predetermined level.

10. The method of claim 6 wherein said path forming a loop has a distal end, and a proximal end, such that said guide is conveyed in a substantially upright position from said distal end to said proximal end.

11. The method of claim 10 wherein said proximal end is elevated in relation to said distal end.

* * * * *